United States Patent [19]
Araki et al.

[11] Patent Number: 6,096,833
[45] Date of Patent: Aug. 1, 2000

[54] RUBBER COMPOSITION AND PNEUMATIC TIRE USING SAID RUBBER COMPOSITION

[75] Inventors: Shunji Araki; Kazuhiro Yanagisawa, both of Tokyo, Japan

[73] Assignee: Bridgestone Corporation, Tokyo, Japan

[21] Appl. No.: 08/934,396

[22] Filed: Sep. 19, 1997

[30]     Foreign Application Priority Data

Dec. 16, 1996  [JP]  Japan ................................. 8-335973

[51] Int. Cl.$^7$ ........................ C08C 19/25; C08C 19/20; C08F 8/34; C08F 8/00
[52] U.S. Cl. .................. 525/342; 525/331.9; 525/332.6; 525/333.1; 525/343
[58] Field of Search ................................. 575/342, 343, 575/331.9, 332.6, 333.1

[56]        References Cited

U.S. PATENT DOCUMENTS 3,873,489  3/1975  Thurn .
5,788,786  8/1998  Yamauchi ............................... 152/209

FOREIGN PATENT DOCUMENTS 50-29741     9/1975   Japan .
51-20208     6/1976   Japan .
62-283001   12/1987   Japan .
7-258469    10/1995   Japan .

*Primary Examiner*—Fred Zitomer
*Attorney, Agent, or Firm*—Sughrue, Mion, Zinn, Macpeak & Seas, PLLC

[57]            ABSTRACT

The present invention provides a rubber composition and a pneumatic tire using the rubber composition. The rubber composition comprises a diene base rubber comprising at least 15% by weight of a polybutadiene rubber, silica in an amount of 10 to 80 parts by weight per 100 parts by weight of the diene base rubber and, in an amount of 1 to 20% by weight of the amount of silica, a specific silane coupling agent, i.e., a bis (alkoxysilylalkyl) polysulfide having a polysulfide chain in which the distribution of sulfur is specified. After curing, the cured rubber composition includes closed cells. Therefore, the rubber composition has a good processability at the time of manufacturing of a tire and a pneumatic tire using the same has excellent snow/ice grip performance and abrasion resistance.

16 Claims, No Drawings

RUBBER COMPOSITION AND PNEUMATIC TIRE USING SAID RUBBER COMPOSITION

BACKGROUND OF THE INVENTION

1. Field of the Invention

The present invention relates to a rubber composition and to a pneumatic tire using the rubber composition, and more particularly, to a rubber composition and to a pneumatic tire using the rubber composition in which driving and braking abilities on snow or icy road surface (hereinafter referred to only as "snow/ice grip performance") are improved and abrasion resistance and processability at the time of manufacturing of a tire are remarkably improved.

2. Description of the Related Art

Due to the regulation regarding a spiked tire, development of a studless tire which satisfies the snow/ice grip performance of tires on snow or icy road surface has been strongly desired. Various studies have been done to the tread patterns of a tire, the rubber compound of a tread, or the like.

A so-called foamed tire (Japanese Patent Application Laid-Open No. Sho-62-283001), in which a rubber which mainly comprises a natural rubber/polybutadiene rubber and a carbon black is used for a foamed rubber layer provided at the tread, is well known as an example of improving the snow/ice grip performance by the tread rubber compound of a tire. This foamed tire has an excellent snow/ice grip performance, and when the tire is manufactured, the technology has solved a difficult technical drawback of controlling both vulcanization reaction and foaming reaction at the time of vulcanization.

In order to improve abrasion resistance of the foamed tire, it is preferable that the amount of a polybutadiene rubber used in the tread is increased. However, the polybutadiene rubber reduces the wet skid resistance of the tire. In order to solve the drawback, Japanese Patent Application Laid-Open No. Hei-7-258469 proposes a technology in which a combination of carbon black and silica is used as a filler.

However, silica particles tend to cohere together due to hydrogen bonding of silanol groups which are functional groups on the surfaces of the silica particles. For improving the dispersion of silica particles into rubber, the mixing time must be increased. When dispersion of silica particles into rubber is insufficient, a problem arises in that processability in processes such as extrusion and the like deteriorates due to the increase in Mooney viscosity.

Moreover, the surfaces of the silica particles are acidic. Therefore, there are problems in that basic substances used as vulcanization accelerators are absorbed such that vulcanization is not carried out sufficiently, and a sufficient modulus of elasticity is not obtained.

In order to solve these problems, various types of silane coupling agents have been developed. For example, an art in which a silane coupling agent serves as a reinforcing material is disclosed in Japanese Patent Application Publication No. Sho-50-29741. However, the use of a silane coupling agent as a reinforcing material is still insufficient for improving fracture properties, workability, and processability of a rubber composition to high standards. Rubber compositions in which a combination of silica and silane coupling agent is used as a reinforcing material are described in Japanese Patent Application Publication No. Sho-51-20208 and others. However, this method of using a combination of silica and silane coupling agent as a reinforcing material has a drawback in that flow of the uncured rubber composition is markedly inferior and workability and processability deteriorate, although reinforcement of the rubber composition can be remarkably improved and fracture properties are improved.

The drawbacks of the conventional technologies in which silane coupling agents are used arise due to the following mechanism. When the mixing temperature of rubber is low, the silanol group on the surface of the silica does not react sufficiently with the silane coupling agent, and as a result, a sufficient reinforcing effect is not obtained. Dispersion of the silica into the rubber is also inferior, and this causes deterioration of the low heat buildup property which is the strong point of a rubber composition containing silica. Moreover, some of the alcohol formed by the reaction of the silanol group on the surface of the silica and the silane coupling agent does not vaporize completely during mixing because of the low mixing temperature, and the residual alcohol in the rubber vaporizes during an extrusion process so as to form blisters.

On the other hand, when mixing is conducted at high temperatures of 150° C. or more, the silanol group on the surface of the silica and the silane coupling agent sufficiently react with each other, and as a result, the reinforcing property is improved. Because dispersion of the silica into the rubber is also improved, a rubber composition having a good low heat buildup property is obtained, and the formation of blisters in an extrusion process is suppressed. However, in this temperature range, gelation of the polymer caused by the silane coupling agent takes place simultaneously, and the Mooney viscosity is markedly increased. Thus, processing in later stages becomes impossible in actuality.

Therefore, when a silane coupling agent is used in combination with silica, a multistep mixing must be conducted at a temperature lower than 150° C., and marked decrease in productivity is inevitable. When the mixing at a low temperature is conducted, dispersion of silica and carbon black into the rubber is insufficient and abrasion resistance deteriorates.

SUMMARY OF THE INVENTION

Accordingly, an object of the present invention is to provide a rubber composition and a pneumatic tire using the rubber composition in which snow/ice grip performance, abrasion resistance, and processability at the time of manufacturing of a tire are improved.

In order to achieve the above object, a rubber composition of the present invention which comprises a diene base rubber comprising at least 15% by weight of a polybutadiene rubber; silica in an amount of 10 to 80 parts by weight, preferably 15 to 60 parts by weight, per 100 parts by weight of the diene base rubber; in an amount of 1 to 20% by weight, preferably 3 to 15% by weight, of the amount of silica, a silane coupling agent which is represented by following general formula (1):

$$(C_nH_{2n+1}O)_3Si-(CH_2)_m-S_y-(CH_2)_m-Si(C_nH_{2n+1}O)_3 \qquad (1)$$

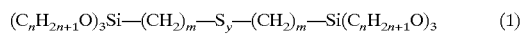

(wherein n represents an integer of 1 to 3, m represents an integer of 1 to 9, y represents a positive number of 1 or more which has a distribution), and in which the content of trisulfide silane is 20% or more based on the entire polysulfide silane and the content of high polysulfide silane, in which y is 5 or a number larger than 5, is 50% or less; and after curing, said rubber composition includes closed cells.

It is preferable that the diene base rubber comprises 20 to 80 parts by weight of a rubber component comprising at least one member selected from the group consisting of natural rubber and synthetic isoprene rubbers and 80 to 20 parts by weight of a cis-1,4-polybutadiene rubber. Further, it is preferable that the expansion ratio of the cured diene base rubber is 2 to 50%.

Further, it is preferable that the content of trisulfide silane in the polysulfide silane coupling agent molecule represented by the above general formula (1) is 30% or more based on the entire polysulfide silane and that the content of high polysulfide silane, in which y is 5 or a number larger than 5, is 40% or less based on the entire polysulfide silane.

Moreover, it is preferable that the rubber composition of the present invention comprises 5 to 50 parts by weight of carbon black, which has a nitrogen absorption specific surface area ($N_2SA$) of 105 $m^2/g$ or more and has a dibutyl phthalate oil absorption (DBP) of 110 ml/100 g or more, per 100 parts by weight of the diene base rubber. Further, it is preferable that the sum of the amount of carbon black and the amount of silica is 80 parts by weight or less per 100 parts by weight of the diene base rubber and that a weight ratio of the amount of carbon black to the amount of silica is 1:0.5 to 1:15, and more preferably 1:0.5 to 1:7.

Furthermore, the present invention relates to a pneumatic tire which is manufactured by using the rubber composition for tread of the tire.

DESCRIPTION OF THE PREFERRED EMBODIMENTS

As the rubber component of the rubber composition in the present invention, a diene base rubber which includes at least 15% by weight of polybutadiene rubber can be used. As the other diene base rubber, styrene-butadiene copolymer rubber, butyl rubber, halogenated butyl rubber, natural rubber, polyisoprene rubber, and the like can be used. From the viewpoint of snow/ice grip performance, it is preferable that a blend of natural rubber and/or synthetic isoprene rubber in an amount of 20 to 80 parts by weight and cis-1,4-polybutadiene rubber in an amount of 80 to 20 parts by weight is used.

The silica used in the present invention is a synthetic silica manufactured by a precipitation process. Specific examples of the silica include NIPSIL AQ manufactured by NIPPON SILICA INDUSTRIAL Co., Ltd.; ULTRASIL VN3 and BV 3370GR manufactured by DEGUSSA AG., a German company; RP1165MP, Zeosil 165GR, and Zeosil 175MP manufactured by RHÔNE-POULENC Co.,; and Hisil233, Hisil210, and Hisil255 manufactured by PPG Co. (all trade names). However, the silica used in the present invention is not limited to these examples. The amount of silica used is 10 to 80 parts by weight, preferably 15 to 60 parts by weight, per 100 parts by weight of the diene base rubber. When the amount of silica used is less than 10 parts by weight, the wet skid resistance deteriorates. On the other hand, when the amount of silica used exceeds 80 parts by weight, the rubber composition becomes too hard and the snow/ice grip performance deteriorates.

The silane coupling agent used in the present invention is a silane coupling agent represented by following general formula (1):

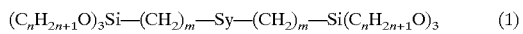

$$(C_nH_{2n+1}O)_3Si\text{—}(CH_2)_m\text{—}Sy\text{—}(CH_2)_m\text{—}Si(C_nH_{2n+1}O)_3 \quad (1)$$

(wherein n represents an integer of 1 to 3, m represents an integer of 1 to 9, and y represents a positive number of 1 or more which has a distribution). It is necessary that the content of trisulfide silane is 20% or more, preferably 30% or more, based on the entire polysulfide silane, and the content of high polysulfide silane, in which y is 5 or a number larger than 5, is 50% or less, preferably 40% or less, based on the entire polysulfide silane. By using this silane coupling agent, the effect of suppressing gelation of a polymer during mixing at high temperatures of 150° C. or more is obtained, and the inferior productivity due to the increase of the Mooney viscosity can be prevented.

The amount of silane coupling agent used is 1 to 20% by weight, preferably 3 to 15% by weight, of the weight of silica. When the amount of silane coupling agent used is less than 1% by weight, a coupling effect is small. On the other hand, when the amount of silane coupling agent used exceeds 20% by weight, gelation of a polymer occurs. Therefore, such amounts are not preferable.

To effectively exhibit the characteristics of the rubber composition of the present invention, the mixing temperature at the time of masterbatching is preferably 150° C. or more and 180° C. or less. When the mixing temperature is lower than 150° C., the silane coupling agent does not react sufficiently with the silica and blisters are formed during extrusion. On the other hand, when the mixing temperature exceeds 180° C., gelation of a polymer takes place such that the Mooney viscosity increases. Therefore, such temperatures are not preferable from the standpoint of processing.

The mechanism for preventing gelation of a polymer and improving abrasion resistance at a mixing temperature of 150° C. or more is described hereinafter on the basis of the results of studies and considerations of the results.

A silane coupling agent generally used in the tire industry (trade name: Si69, manufactured by DEGUSSA AG., a German company) was heated in an oven at 150° C. for 2 hours and cooled. Thereafter, the treated silane coupling agent was analyzed by high performance liquid chromatography. It was confirmed from the results of the analysis that the components having sulfur chains of —$S_6$— or longer in the molecule were decreased as compared to the original material, and the free sulfur and components having sulfur chains of —$S_4$— or shorter in the molecule were increased as compared to the original material. In other words, it was thought that the components having sulfur chains of —$S_6$— or longer in the molecule were decomposed by the heating at a high temperature. It can be surmised that gelation of a polymer takes place during mixing at a high temperature because radicals are formed during the decomposition of the silane coupling agent or because products formed by the decomposition work as a source of sulfur. Therefore, it was believed that gelation of a polymer is suppressed during mixing at temperatures of 150° C. or more when the silane coupling agent originally contains smaller amounts of the components having long sulfur chains in the molecule. As the result of intensive studies in accordance with the above idea, it was found that, when the proportion of the components having short sulfur chains in the molecule among the components having sulfur chains of various lengths in the molecule was increased to a specific value or more, gelation of the polymer was actually suppressed. Moreover, dispersion of silica into rubber was improved because the reaction of the silanol group on the surface of the silica and the silane coupling agent took place sufficiently due to mixing at a high temperature, and abrasion resistance was improved.

As a filler for the rubber composition of the present invention, carbon black can be used along with silica. The carbon black, which has a nitrogen absorption specific surface area ($N_2SA$) of 105 $m^2/g$ or more and has a dibutyl phthalate oil absorption (DBP) of 110 ml/100 g or more, is preferably used. Specific examples of carbon black include a carbon black of the grade SAF, ISAF-HM, ISAF-HS, or the like. The amount of carbon black used is 5 to 50 parts by weight, preferably 5 to 40 parts by weight, per 100 parts by weight of a diene base rubber. When the amount of carbon black used is less than 5 parts by weight, the tensile strength at the time of cutting of a rubber is low and the abrasion resistance deteriorates. On the other hand, when the amount of carbon black used exceeds 50 parts by weight, the hardness of a rubber is too high and the snow/ice grip performance is insufficient.

DBP is determined in accordance with ASTM D2414-93 and $N_2SA$ is determined in accordance with ASTM D4820.

The sum of the amount of carbon black and the amount of silica is preferably 80 parts by weight or less per 100 parts by weight of a diene base rubber, and the weight ratio of the amount of carbon black to the amount of silica is preferably from 1:0.5 to 1:15, more preferably from 1:0.5 to 1:7. When the amount of carbon black is too small, the fracture strength of the foamed layer decreases. On the contrary, when the amount of carbon black is too large, the wet skid resistance deteriorates.

Examples of the foaming agent which can be used for foaming the rubber composition of the present invention include azodicarbonamide, dinitrosopentamethylenetetramine, azobisisobutyronitrile, and aromatic sulfonylhydrazide compound such as benzenesulfonylhydrazide, toluenesulfonylhydrazide, and oxybis-benzenesulfonylhydrazide. Alternatively, the rubber composition may be foamed by high-pressure-mixing with gas without using the foaming agent.

The expansion ratio of the cured rubber composition of the present invention is preferably within the range of 2 to 50%. When the expansion ratio is less than 2%, the dewatering effect on the surface of the rubber on the icy road does not appear such that the improvement of snow/ice grip performance cannot be observed. On the other hand, when the expansion ratio exceeds 50%, the durability and the abrasion resistance deteriorate. Therefore, these expansion ratios are not preferable.

Into the rubber composition of the present invention, compounding ingredients which are generally used such as antioxidants, zinc oxide, stearic acid, softeners can be mixed. If necessary, a filler such as magnesium carbonate, calcium carbonate, glass fiber, aluminum hydroxide, clay, and whisker can be added.

In a pneumatic tire of the present invention, the aforementioned rubber composition is used for the tread portion of the tire. However, for example, in case of a so-called cap/base structure in which a tread is formed by two layers, the rubber composition may be used only for the cap layer of a tread.

EXAMPLES

The present invention is described more specifically with reference to the following Examples.

Various rubber compositions were prepared in accordance with the formulations given in the following Tables 2 and 3. The silane coupling agents used in the formulations are expressed by the following formula:

$$(C_2H_5O)_3Si(CH_2)_3-Sy-(CH_2)_3Si(C_2H_5O)_3$$

and —Sy— in this formula has the distribution shown in Table 1. The distributions of various sulfur chain components (—$S_y$—) shown in Table 1 were obtained by calculation from peak areas (%) obtained by high performance liquid chromatography (HPLC). The analysis by HPLC is described in detail hereinafter.

(Conditions of analysis by HPLC)

HPLC: manufactured by TOSOH CORPORATION, HLC-8020

UV detector: manufactured by TOSOH CORPORATION, UV-8010 (254 nm)

Recorder: manufactured by TOSOH CORPORATION, SUPER SYSTEM CONTROLLER SC-8010

Column: manufactured by TOSOH CORPORATION, TSKgel ODS-80TMCTR (inner diameter: 4.6 mm, length: 10 cm)

Temperature at the time of measurement: 25° C.

Concentration of sample: 6 mg/10 cc (6 mg per 10 cc of) acetonitrile solution

Amount of sample injected: 20 μl

Condition of elusion: flow rate of 1 cc/min

A sample was eluted for 2 minutes with a mixed solution of acetonitrile and water having a fixed composition of 1:1, and then with a mixed solution having a varying composition with such a gradient that the solution contained 100% of acetonitrile after 18 minutes.

TABLE 1

|  | —$S_2$— | —$S_3$— | —$S_4$— | —$S_5$— | —$S_6$— | —$S_7$— | —$S_8$— | —$S_9$— | —$S_5$— or more |
|---|---|---|---|---|---|---|---|---|---|
| sample A[*1] | 2.53 | 15.85 | 23.77 | 24.27 | 18.33 | 10.24 | 3.83 | 1.18 | 57.85 |
| sample B | 7.16 | 30.33 | 29.38 | 18.29 | 8.24 | 3.28 | 0.96 | 2.36 | 33.13 |
| sample C | 17.64 | 44.14 | 23.40 | 8.49 | 1.92 | 1.06 | 3.37 | 0 | 14.83 |
| sample D | 8.1 | 59.0 | 18.7 | 14.2 | 0 | 0 | 0 | 0 | 14.2 |
| sample E | 11.1 | 62.8 | 26.1 | 0 | 0 | 0 | 0 | 0 | 0 |
| sample F | 97.3 | 2.7 | 0 | 0 | 0 | 0 | 0 | 0 | 0 |

Samples A to F in Table 1 were obtained as follows.
Sample A Si69, manufactured by DEGUSSA AG., a German company
Samples B and C
Samples B and C were synthesized in accordance with the method described in Japanese Patent Application Laid-Open No. Hei-7-228588 from anhydrous sodium sulfide and sulfur in the following mol ratios:
sample B 1:2
sample C 1:1.5
Sample D
506 g (1 mol) of sample B which has a polysulfide distribution shown in Table 1 was weighed and charged into a 1-litre flask. 78.7 g (0.3 mol) of triethyl phosphite was added dropwise into the flask through a dropping funnel over 2 hours while stirring the solution within the flask. During this time, the temperature within the flask rose from 25° C. to 50° C. The stirring was conducted for another 3 hours and a portion of the solution was checked through gas chromatography. It was found that a peak assigned to triethyl phosphite was diminished and that the reaction took place. Table 1 shows the results of measurement of polysulfide distributions in the obtained composition through liquid chromatography. It shows that high polysulfide portions selectively reacted with the phosphite.
Sample E
538 g (1 mol) of silane (sample A: Si69 manufactured by DEGUSSA AG., a German company), which has the polysulfide distribution shown in Table 1 and which has an average of four sulfur atoms per polysulfide chain, was weighed and charged into a 1-litre flask. 166.2 g (1 mol) of triethyl phosphite was added dropwise into the flask through a dropping funnel over 2 hours while stirring the solution within the flask. During this time, the flask was cooled by water in order to maintain the temperature therewithin at 50° C. or lower. Next, the flask was heated and stirred for 3 hours at 40 to 50° C. Thereafter, sample E was obtained in the same way as sample D.

Sample F

Sample F was synthesized in accordance with the method described in Japanese Patent Application Laid-Open No. Hei-8-259739.

Various types of rubber compositions in Examples and Comparative Examples were prepared by using the obtained samples. These were applied to the treads of 185/60R14 size pneumatic tires for a passenger car and various types of tires were manufactured.

The obtained rubber compositions were evaluated with respect to Mooney viscosity in accordance with the following method of evaluation. Further, the manufactured tires were evaluated with respect to expansion ratio Vs, snow/ice grip performance (ICE$\mu$), and abrasion resistance in accordance with the following methods.

(1) Mooney viscosity

Mooney viscosity was measured in accordance with the method of Japanese Industrial Standard K6300 for a time of 4 minutes at a temperature of 130° C. after preheating for 1 minute. The obtained result is expressed as an index with Comparative Example 1 being 100. The smaller the index, the lower the Mooney viscosity and the better the processability.

(2) Expansion Ratio Vs

Expansion Ratio Vs is expressed by the following formula (A):

$$Vs = \{(\rho o - \rho g)/(\rho_1 - \rho g) - 1\} \times 100 (\%) \quad (A)$$

(wherein, $\rho_1$ (g/cm$^3$) is the density of a foamed rubber, $\rho$ o (g/cm$^3$) is the density of a solid-phase rubber portion of a foamed rubber, and $\rho$ g (g/cm$^3$) is the density of a gas portion in cells of a foamed rubber). The density $\rho$ g of the gas portion in cells is extremely small and is approximately zero. Additionally, the density $\rho$ g is extremely small as compared to the density $\rho$ o of the solid-phase rubber portion. Accordingly, the above-described formula (A) is substantially equal to the following formula:

$$Vs = \{(\rho o / \rho_1) - 1\} \times 100 (\%). \quad (B)$$

A block-shaped sample was cut out from the foamed rubber layer of the tread of the test tire. The density $\rho_1$ (g/cm$^3$) of the sample and the density $\rho$ o (g/cm$^3$) of the non-foamed rubber (the solid-phase rubber) were measured. The expansion ratio Vs was determined in accordance with the above formula (B).

(3) Sriow/Ice grip performance

As an index, a snow/ice grip performance is represented by braking ability on ice. Four test tires were placed on each of 2000 cc passenger vehicles, and braking ability was measured on ice at temperature of –2° C. The index (ICE$\mu$ index) of foamed tires which do not use silica (Comparative Example 1) was expressed as 100. The larger the numerical value of the index, the better the braking ability.

(4) Abrasion resistance

Four test tires were placed on each of 2000 cc passenger vehicles. After the vehicles were run about 30,000 km, the depth of a groove remained at the tires was measured. The abrasion resistance was determined in accordance with the following formula: {(running distance (km) of test tires)/ (depth (mm) of initial groove—depth (mm) of groove remained at the tires after the running)}/{(running distance (km) of Comparative Example 1 tires)/(depth (mm) of initial groove—depth (mm) of groove remained in Comparative Example 1 tires after the running)}. The larger the numerical value, the better the abrasion resistance.

The obtained results are illustrated in the following Tables 2 and 3.

TABLE 2

| Example | | | | | 1 | 2 | 3 | 4 | |
|---|---|---|---|---|---|---|---|---|---|
| Comparative Example | 1 | 2 | 3 | 4 | | | | | 5 |
| Formulation (parts by weight) | | | | | | | | | |
| natural rubber | 100 | 70 | 70 | 70 | 70 | 70 | 70 | 70 | 70 |
| polybutadiene rubber*1 | — | 30 | 30 | 30 | 30 | 30 | 30 | 30 | 30 |
| carbon black*2 | 50 | 25 | 25 | 25 | 25 | 25 | 25 | 25 | 25 |
| silica*3 | — | 40 | 40 | 40 | 40 | 40 | 40 | 40 | 40 |
| silane coupling agent    type | — | A | A | A | B | C | D | E | F |
| silane coupling agent    amount | — | 3.0 | 3.0 | 3.0 | 3.0 | 3.0 | 3.0 | 3.0 | 3.0 |
| aromatic oil | 5.0 | 5.0 | 5.0 | 5.0 | 5.0 | 5.0 | 5.0 | 5.0 | 5.0 |
| stearic acid | 2.0 | 2.0 | 2.0 | 2.0 | 2.0 | 2.0 | 2.0 | 2.0 | 2.0 |
| antioxidant*4 | 2.5 | 2.5 | 2.5 | 2.5 | 2.5 | 2.5 | 2.5 | 2.5 | 2.5 |
| zinc oxide | 2.0 | 2.0 | 2.0 | 2.0 | 2.0 | 2.0 | 2.0 | 2.0 | 2.0 |
| vulcanization accelerator MBTS*5 | 0.2 | 0.2 | 0.2 | 0.2 | 0.2 | 0.2 | 0.2 | 0.2 | 0.2 |
| vulcanization accelerator CBS*6 | 0.5 | 0.5 | 0.5 | 0.5 | 0.5 | 0.5 | 0.5 | 0.5 | 0.5 |
| sulfur | 1.5 | 1.5 | 1.5 | 1.5 | 1.5 | 1.5 | 1.5 | 1.5 | 1.5 |
| foaming agent DNPT*7 | 5.0 | 5.0 | 5.0 | 5.0 | 5.0 | 5.0 | 5.0 | 5.0 | 5.0 |
| masterbatch temperature (° C.) | 153 | 142 | 154 | 165 | 164 | 166 | 162 | 163 | 165 |
| Results of evaluation | | | | | | | | | |
| expansion ratio (%) | 24.3 | 22.8 | 23.1 | 23.4 | 22.3 | 22.9 | 22.8 | 22.0 | 22.8 |
| Mooney viscosity (index) | 100 | 105 | 118 | 177 | 91 | 91 | 88 | 92 | 88 |
| ICE $\mu$ (index) | 100 | 112 | 112 | — | 111 | 110 | 112 | 110 | 98 |
| abrasion resistance (index) | 100 | 84 | 97 | — | 115 | 111 | 110 | 113 | 84 | masterbatch temperature: a measured temperature of masterbatch immediately after mixing In Table 2, because the Mooney viscosity is too high and the rubber compound cannot be extruded, tires of Comparative Example 4 cannot be manufactured.

TABLE 3

| Example | 5 | 6 | | 7 | 8 | | 9 | 10 | 11 |
|---|---|---|---|---|---|---|---|---|---|
| Comparative Example | | | 6 | | | 7 | | | |
| Formulation (parts by weight) | | | | | | | | | |
| natural rubber | 80 | 20 | 90 | 10 | 70 | 70 | 60 | 60 | 70 |
| polybutadiene rubber*1 | 20 | 80 | 10 | 90 | 30 | 30 | 40 | 40 | 30 |
| carbon black*2 | 25 | 25 | 25 | 25 | 5 | 5 | 25 | 25 | 25 |
| silica*3 | 40 | 40 | 40 | 40 | 70 | 90 | 35 | 35 | 35 |
| silane coupling agent   type | C | C | C | C | C | C | C | C | C |
| silane coupling agent   amount | 3.0 | 3.0 | 3.0 | 3.0 | 7.0 | 9.0 | 3.5 | 5.5 | 1.0 |
| aromatic oil | 5.0 | 5.0 | 5.0 | 5.0 | 5.0 | 5.0 | 5.0 | 5.0 | 5.0 |
| stearic acid | 2.0 | 2.0 | 2.0 | 2.0 | 2.0 | 2.0 | 2.0 | 2.0 | 2.0 |
| antioxidant*4 | 2.5 | 2.5 | 2.5 | 2.5 | 2.5 | 2.5 | 2.5 | 2.5 | 2.5 |
| zinc oxide | 2.0 | 2.0 | 2.0 | 2.0 | 2.0 | 2.0 | 2.0 | 2.0 | 2.0 |
| vulcanization accelerator MBTS*5 | 0.2 | 0.2 | 0.2 | 0.2 | 0.2 | 0.2 | 0.2 | 0.2 | 0.2 |
| vulcanization accelerator CBS*6 | 0.5 | 0.5 | 0.5 | 0.5 | 0.5 | 0.5 | 0.5 | 0.5 | 0.5 |
| sulfur | 1.5 | 1.5 | 1.5 | 1.5 | 1.5 | 1.5 | 1.5 | 1.5 | 1.5 |
| foaming agent DNPT*7 | 5.0 | 5.0 | 5.0 | 5.0 | 5.0 | 5.0 | 5.0 | 5.0 | 5.0 |
| masterbatch temperature (° C.) | 164 | 161 | 163 | 162 | 166 | 172 | 162 | 164 | 162 |
| Results of evaluation | | | | | | | | | |
| expansion ratio (%) | 21.2 | 21.5 | 25.4 | 20.8 | 19.8 | 18.3 | 21.8 | 23.2 | 19.2 |
| Mooney viscosity (index) | 84 | 97 | 78 | 109 | 97 | 121 | 92 | 96 | 99 |
| ICE μ (index) | 104 | 116 | 100 | 119 | 110 | 106 | 114 | 116 | 108 |
| abrasion resistance (index) | 106 | 129 | 95 | 134 | 120 | 117 | 115 | 120 | 107 | masterbatch temperature: a measured temperature of masterbatch immediately after mixing
*1UBEPOL BR150L (manufactured by UBE INDUSTRIES, Ltd.)
*2SEAST 9H (manufactured by TOKAI CARBON Co., Ltd.), $N_2SA$: 142 $m^2/g$, DBP: 136 ml/100 g (catalogue value)
*3NIPSIL AQ (manufactured by NIPPON SILICA INDUSTRIAL Co., Ltd.)
*4N-isopropyl-N'-phenyl-p-phenylenediamine
*5dibenzothiazyldisulfide
*6N-cyclohexyl-2-benzothiazolesulfenamide
*7dinitrosopentamethylenetetramine Because the rubber composition of the present invention uses a silane coupling agent having a specific distribution of sulfur, formation of blisters during extrusion and gelation of a polymer due to the silane coupling agent are simultaneously suppressed during mixing at high temperatures of 150° C. or more. Therefore, processability at the time of manufacturing of a tire is remarkably improved, and the rubber composition is widely used for various types of pneumatic tires having excellent snow/ice grip performance and abrasion resistance.

What is claimed is:

1. A rubber composition which comprises a diene base rubber comprising at least 15% by weight of a polybutadiene rubber; silica in an amount of 10 to 80 parts by weight per 100 parts by weight of the diene base rubber; in an amount of 1 to 20% by weight of the amount of silica, a silane coupling agent which is represented by following general formula (1):

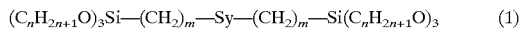
$$(C_nH_{2n+1}O)_3Si\text{—}(CH_2)_m\text{—}S_y\text{—}(CH_2)_m\text{—}Si(C_nH_{2n+1}O)_3 \quad (1)$$

(wherein n represents an integer of 1 to 3, m represents an integer of 1 to 9, y represents a positive number of 1 or more which has a distribution), and in which the content of trisulfide silane is 20% or more based on the entire polysulfide silane and the content of high polysulfide silane, in which y is 5 or a number greater than 5, is 50% or less; and after curing, said rubber composition includes closed cells.

2. A rubber composition according to claim 1, wherein the diene base rubber comprises 20 to 80 parts by weight of a rubber component comprising at least one member selected from the group consisting of natural rubber and synthetic isoprene rubbers and 80 to 20 parts by weight of a cis-1,4-polybutadiene rubber.

3. A rubber composition according to claim 1, wherein the amount of silica is 15 to 60 parts by weight per 100 parts by weight of the diene base rubber.

4. A rubber composition according to claim 1, wherein the expansion ratio of the cured diene base rubber is 2 to 50%.

5. A rubber composition according to claim 1, wherein the amount of silane coupling agent is 3 to 15% by weight of the amount of silica.

6. A rubber composition according to claim 1, wherein the content of trisulfide silane in the polysulfide silane coupling agent molecule represented by general formula (1) is 30% or more based on the entire polysulfide silane, and the content of high polysulfide silane, in which y is 5 or a number greater than 5, is 40% or less based on the entire polysulfide silane.

7. A rubber composition according to claim 1, wherein the rubber composition comprises 5 to 50 parts by weight of carbon black per 100 parts by weight of the diene base rubber, the carbon black having a nitrogen absorption specific surface area ($N_2SA$) of 105 $m^2/g$ or more and having a dibutyl phthalate oil absorption (DBP) of 110 ml/100 g or more.

8. A rubber composition according to claim 7, wherein the sum of the amount of carbon black and the amount of silica is 80 parts by weight or less per 100 parts by weight of the diene base rubber, and a weight ratio of the amount of carbon black to the amount of silica is 1:0.5 to 1:15.

9. A rubber composition according to claim 8, wherein a weight ratio of the amount of carbon black to the amount of silica is 1:0.5 to 1:7.

10. A pneumatic tire which is manufactured by using the rubber composition described in claim 1 for tread rubber.

11. A pneumatic tire which is manufactured by using the rubber composition described in claim 2 for tread rubber.

12. A pneumatic tire which is manufactured by using the rubber composition described in claim 4 for tread rubber.

13. A pneumatic tire which is manufactured by using the rubber composition described in claim 6 for tread rubber.

14. A pneumatic tire which is manufactured by using the rubber composition described in claim 7 for tread rubber.

15. A pneumatic tire which is manufactured by using the rubber composition described in claim 8 for tread rubber.

16. A rubber composition according to claim 1, wherein the rubber composition is obtained by a mixing at a temperature of 150° C. or more.

* * * * *

(12) EX PARTE REEXAMINATION CERTIFICATE (5414th)
United States Patent
Araki et al.

(10) Number: US 6,096,833 C1
(45) Certificate Issued: Jun. 20, 2006

(54) RUBBER COMPOSITION AND PNEUMATIC TIRE USING SAID RUBBER COMPOSITION

(75) Inventors: Shunji Araki, Tokyo (JP); Kazuhiro Yanagisawa, Tokyo (JP)

(73) Assignee: Bridgestone Corporation, Tokyo (JP)

Reexamination Request:
No. 90/006,369, Aug. 30, 2002

Reexamination Certificate for:
Patent No.: 6,096,833
Issued: Aug. 1, 2000
Appl. No.: 08/934,396
Filed: Sep. 19, 1997

(30) Foreign Application Priority Data

Dec. 16, 1996 (JP) .............................. 8-335973

(51) Int. Cl.
C08C 19/25 (2006.01)
C08C 19/20 (2006.01)
C08F 8/34 (2006.01)
C08F 8/00 (2006.01)
C08K 3/34 (2006.01)

(52) U.S. Cl. ................. 525/342; 525/333.1; 525/331.9; 525/332.6; 525/343; 524/493; 524/496; 152/151; 152/450

(58) Field of Classification Search ................. 525/342, 525/343, 332.6; 524/493, 496; 152/151, 450
See application file for complete search history.

(56) References Cited

U.S. PATENT DOCUMENTS 4,517,336 A    5/1985   Wolff et al. .................. 524/571
5,362,794 A *  11/1994  Inui et al.
5,447,971 A    9/1995   Bergh et al. ................. 523/213
5,534,574 A    7/1996   Sandstrom et al. ......... 524/262
5,605,951 A *  2/1997   Sandstrom et al.
5,674,932 A *  10/1997  Agostini et al. ............ 524/430
5,817,852 A    10/1998  Ichinohe et al. ............ 556/427
5,877,249 A *  3/1999   Lambotte
6,090,880 A *  7/2000   Zimmer et al.

FOREIGN PATENT DOCUMENTS

CA    2104528    11/1994
CA    2129281    11/1995

OTHER PUBLICATIONS

Degussa AG Catalog Si 69 X50–S X50.

* cited by examiner

Primary Examiner—Tae H. Yoon

(57) ABSTRACT

The present invention provides a rubber composition and a pneumatic tire using the rubber composition. The rubber composition comprises a diene base rubber comprising at least 15% by weight of a polybutadiene rubber, silica in an amount of 10 to 80 parts by weight per 100 parts by weight of the diene base rubber and, in an amount of 1 to 20% by weight of the amount of silica, a specific silane coupling agent, i.e., a bis (alkoxysilylalkyl) polysulfide having a polysulfide chain in which the distribution of sulfur is specified. After curing, the cured rubber composition includes closed cells. Therefore, the rubber composition has a good processability at the time of manufacturing of a tire and a pneumatic tire using the same has excellent snow/ice grip performance and abrasion resistance.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 6 are determined to be patentable as amended.

Claims 2–5 and 7–16, dependent on an amended claim, are determined to be patentable.

1. A rubber composition which [comprises] *consists essentially of* a diene base rubber comprising at least 15% by weight of a polybutadiene rubber; silica in an amount of 10 to 80 parts by weight per 100 parts by weight of the diene base rubber; [in an amount of 1 to 20% by weight of the amount of] *mixing with the rubber component and the* silica, a silane coupling agent which is represented by following general formula (1) *in an amount of 1 to 20% by weight of the amount of silica and a foaming agent*:

$(C_nH_{2n+1}O)_3Si-(CH_2)_m-S_y-(CH_2)_m-Si(C_nH_{2n+1}O)_3$ (1)

(wherein n represents an integer of 1 to 3, m represents an integer of 1 to 9, [y represents a positive number of 1 or more which has a distribution] *and wherein y ranges from 2 to 9 such that the silane coupling agent represents a mixture of polysulfide silanes*), and in which the content of trisulfide silane is [20%] *44.14%* or more based on the entire polysulfide silane and the content of high polysulfide silane, in which y is 5 or a number greater than 5, is 50% or less; and
  after curing, said rubber composition includes closed cells.

6. A rubber composition according to claim 1, wherein [the content of trisulfide silane in the polysulfide silane coupling agent molecule represented by general formula (1) is 30% or more based on the entire polysulfide silane, and] the content of high polysulfide silane, in which y is 5 or a number greater than 5, is 40% or less based on the entire polysulfide silane.

* * * * *